United States Patent [19]

Masrur et al.

[11] Patent Number: 5,027,048
[45] Date of Patent: Jun. 25, 1991

[54] FIELD ORIENTED MOTOR CONTROLLER FOR ELECTRICALLY POWERED ACTIVE SUSPENSION FOR A VEHICLE

[75] Inventors: Md. A. Masrur, West Bloomfield; John M. Miller, Saline; Prabhakar B. Patil, Southfield, all of Mich.

[73] Assignee: Ford Motor Company, Dearborn, Mich.

[21] Appl. No.: 611,220

[22] Filed: Nov. 9, 1990

Related U.S. Application Data

[62] Division of Ser. No. 253,456, Oct. 5, 1988, abandoned.

[51] Int. Cl.$^5$ .............................................. H02P 5/40
[52] U.S. Cl. .................................... 318/806; 318/805; 318/799; 318/809; 177/184; 280/704
[58] Field of Search ............................ 318/798–799, 318/801, 808, 809, 810, 811, 800, 803, 727, 805, 806; 177/184, 185; 280/688, 704, 707

[56] References Cited

U.S. PATENT DOCUMENTS

| | | | |
|---|---|---|---|
| 4,019,107 | 4/1977 | Dixon et al. | 318/432 |
| 4,041,361 | 8/1977 | Cornell | 318/432 |
| 4,051,419 | 9/1977 | Takahashi | 318/227 |
| 4,306,181 | 12/1981 | Welburn | 318/696 |
| 4,336,484 | 6/1982 | Marinko | 318/432 |
| 4,409,526 | 10/1983 | Yamauchi et al. | 318/254 |
| 4,447,771 | 5/1984 | Whited | 318/254 |
| 4,455,514 | 6/1984 | Ohno | 318/254 |
| 4,456,868 | 6/1984 | Yamamura et al. | 318/806 |
| 4,490,661 | 12/1984 | Brown et al. | 318/254 |
| 4,494,051 | 1/1985 | Bailey | 318/254 |
| 4,528,486 | 7/1985 | Flaig et al. | 318/254 |
| 4,546,294 | 10/1985 | Ban et al. | 318/254 |
| 4,558,264 | 12/1985 | Weischedel | 318/254 |
| 4,639,651 | 1/1987 | Shimizu | 318/432 |
| 4,649,331 | 2/1987 | Jahns | 318/806 |
| 4,651,068 | 3/1987 | Meshkat-Razavie | 318/254 |
| 4,658,190 | 4/1987 | Miyazaki et al. | 318/254 |
| 4,713,590 | 12/1987 | Ohno | 318/254 |
| 4,714,878 | 12/1987 | Steinigeweg | 318/432 |
| 4,719,396 | 1/1988 | Shimiza | 318/432 |
| 4,724,373 | 2/1988 | Cipo | 318/805 |
| 4,736,143 | 4/1988 | Nakayara et al. | 318/432 |
| 4,743,815 | 5/1988 | Gee et al. | 318/254 |
| 4,777,422 | 10/1988 | Slicker et al. | 318/808 |
| 4,792,741 | 12/1988 | Matsuo et al. | 318/805 |

FOREIGN PATENT DOCUMENTS

| | | |
|---|---|---|
| 58-95995 | 6/1983 | Japan . |
| 61-128785 | 6/1986 | Japan . |
| 61-258691 | 11/1986 | Japan . |

Primary Examiner—William M. Shoop, Jr.
Assistant Examiner—John W. Cabeca
Attorney, Agent, or Firm—Roger L. May; Mark L. Mollon

[57] ABSTRACT

An electrically powered suspension for a vehicle including a roadwheel and tire assembly, an electrically powered suspension unit having one end attached to the roadwheel and tire assembly and the other end attached to the chassis of the vehicle, with the suspension unit including an electric motor for positioning the roadwheel with respect to the chassis, and a controller for operating the electric motor so as to control the vertical movement of the wheel and tire assembly with respect to the vehicle's chassis. The electric motor may include either a linear or rotating electric motor, acting either alone or in parallel with a static load carrying device such as a fluid or coil spring.

15 Claims, 7 Drawing Sheets

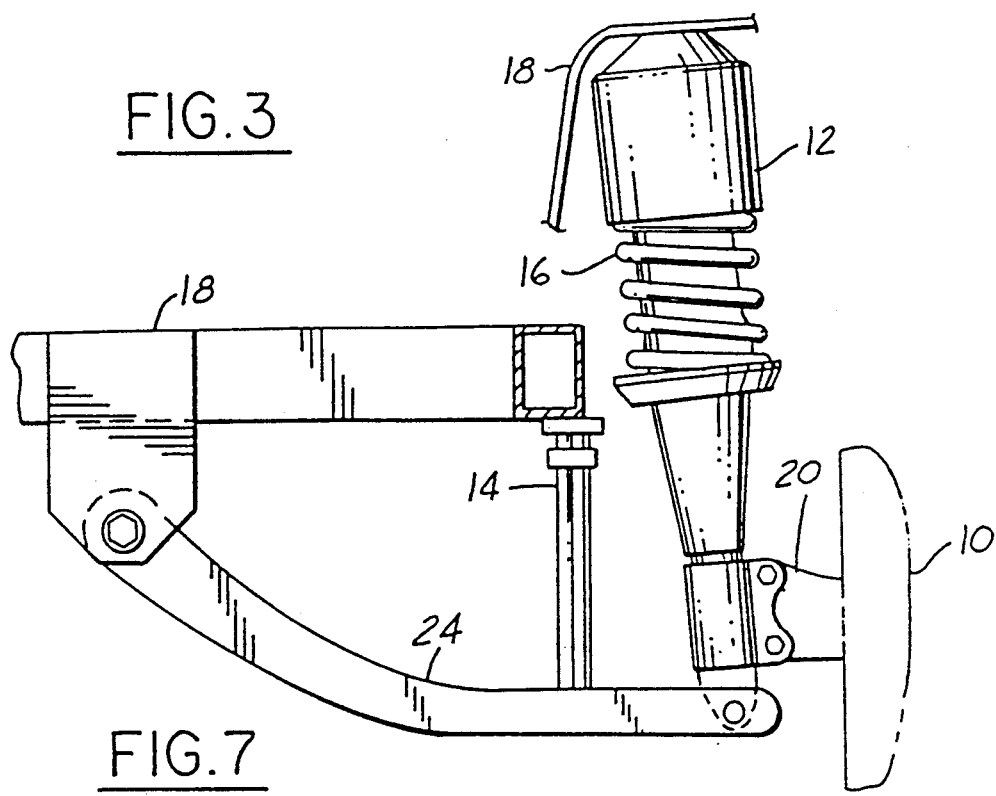
FIG. 3
FIG. 7
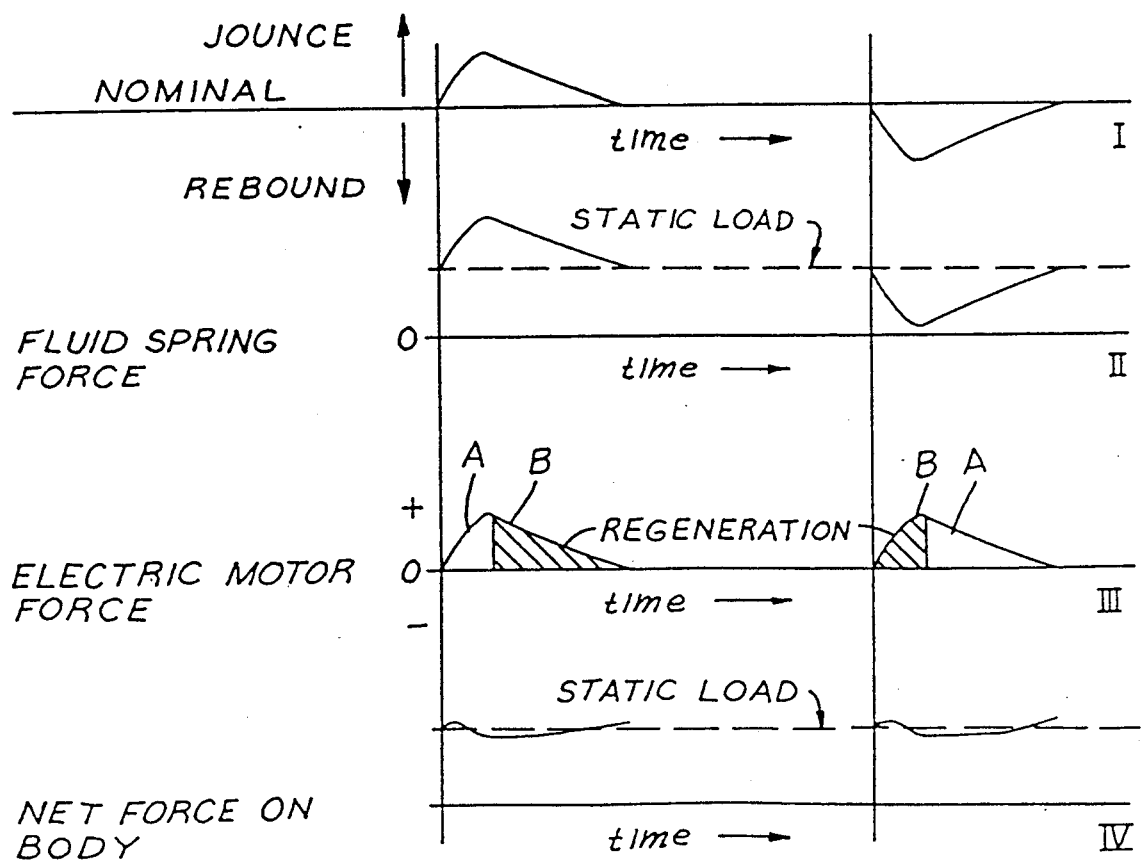

FIELD ORIENTED MOTOR CONTROLLER FOR ELECTRICALLY POWERED ACTIVE SUSPENSION FOR A VEHICLE

This is a division of application Ser. No. 253,456 filed Oct. 5, 1988 now abandoned.

BACKGROUND OF THE INVENTION

1. Field of the Invention

This invention relates to an active suspension for a vehicle in which individual suspension units maintain an appropriate relationship between the roadwheels and the body of the vehicle through the use of forces generated by electric motors, with one of such motors positioned within each of the suspension units. As used herein, the terms "body" and "chassis" mean either a conventional unitized automotive body or a conventional frame and body automobile or any combination thereof.

2. Disclosure Information

For many years, vehicle suspensions, in general, and automotive suspensions, in particular, have been characterized by the use of spring elements and damping elements for controlling the motion of a vehicle body with respect to the roadwheels. Realizing, however, the inflexibility of fixed rate damping and spring element systems, designers have sought to provide a variety of adaptive control systems in which spring rates, ride heights, and/or damping rates could be varied as a result of such criteria as road inputs, vehicle turning maneuvers, vehicle loading, and other variables. U.S. Pat. Nos. 4,333,668; 4,506,909; 4,564,215; 4,635,959 and 4,673,194 all disclose unpowered or low-powered systems for varying damping rate in response to sensed vehicular operating conditions. Similarly, U.S. Pat. Nos. 4,185,845; 4,466,625; 4,568,096 and 4,630,840 all disclose systems for adjusting or maintaining vehicle ride height in response to slow changes in vehicle load.

Although adaptive suspensions have allowed increased ride control by virtue of the ability to change the damping and spring rate characteristics of the suspension, such unpowered systems are generally incapable of counteracting force inputs rising from excitation of the roadwheel and tire assembly by road surface imperfections as well as during turning, braking and acceleration maneuvers. As a result, designers sought to implement so-called active suspensions capable of responding to road inputs in real time with power inputs having sufficient robustness to control body motion. As used herein, the term "active suspension" means a suspension which has frequency response and power output characteristics sufficient to respond in real time to control force inputs to the vehicle chassis arising from such sources as road imperfections, crosswinds, and vehicle turning maneuvers.

Two examples of active suspensions are shown in U.S. Pat. Nos. 4,625,993 and 4,639,013. The '993 patent discloses a system in which the suspension units include a double acting hydraulic actuator for maintaining the location of the roadwheel and tire assembly versus the chassis of the vehicle. The '013 patent discloses a suspension unit in which a variable offset gas spring and a double acting hydraulic actuator are operated in parallel with each other. Both of these systems suffer from common shortcomings inasmuch as such hydraulically powered systems require complex piping and valve componentry. Further, in order to maintain a sufficient head of hydraulic energy for use at any given period of time, an engine driven pump must be continuously operated, thereby extracting energy from the vehicle engine which could otherwise be used to operate the vehicle, even at times when the pump output is not needed. Finally, such hydraulic systems generally are characterized by a high level of objectionable noise emissions.

It is an object of the present invention to provide an electrically powered active suspension for a vehicle in which an electrically driven assembly powered by an electric motor provides up to all of the force required for positioning a roadwheel with respect to the chassis of the vehicle.

It is an advantage of the present invention that an electrically powered active suspension according to this invention will not require the input of significant power while operating in a standby mode.

It is yet another advantage of the present invention that an electrically powered active suspension according to this invention will consume less power than a hydraulic system of comparable output because the conversion of electrical energy to mechanical energy by the suspension units described herein will be more efficient than the conversion of hydraulic energy to mechanical energy by known hydraulic active suspension systems.

It is yet another advantage of the present invention that an electrically powered active suspension according to this invention will permit regenerative operation in which mechanical energy is converted to electrical energy and returned to the electrical energy source, thereby further improving efficiency.

It is yet another advantage of the present invention that an electrically powered active suspension according to this invention will not exhibit the unfavorable noise, vibration and harshness characteristics commonly found with hydraulically powered active suspension systems.

It is yet another advantage of the present invention that an electrically powered active suspension system according to this invention will be more amenable to computer control of the suspension system, which will help to control the power load demands placed by this system upon the vehicle engine or other prime mover.

It is yet another advantage of the present invention that a system according to this invention will have lower system weight than a hydraulically powered system of similar capacity.

It is a feature of a system according to the present invention that very low system response times will permit much flexibility in tuning this system to a particular vehicle.

Other objects, features and advantages of the present invention will become apparent to the reader of this specification.

SUMMARY OF THE INVENTION

An electrically powered active suspension for a vehicle comprises a roadwheel and tire assembly, an electrically driven suspension unit having one end attached to the roadwheel and tire assembly and the other end attached to the chassis of the vehicle, with the suspension unit comprising an electric motor for positioning the roadwheel with respect to the chassis, and control means for operating the electric motor so as to control the vertical movement of the wheel and tire assembly with respect to the chassis. The motor employed herein may comprise a permanent magnet motor, a variable reluctance motor, an induction motor, a synchronous motor, or other types of motors known to those skilled in the art and suggested by this disclosure.

The electric motor in a suspension unit according to the present invention may comprise either a rotary electric motor or a linear motor. In the event that a linear motor is employed, the motor's plunger may be operatively connected with either the wheel and tire assembly or with the chassis, with the stator operatively connected with the remaining component so that sliding movement of the plunger with respect to the stator will be accompanied by vertical movement of the roadwheel and tire assembly with respect to the chassis. The plunger may comprise either a permanent magnet or a coil means excited by the system control means. Similarly, the stator may comprise either a permanent magnet or a coil means, it being understood that at least one of the plunger or stator must be wound. In a preferred embodiment, the linear motor comprises an induction motor having a wound plunger and a hollow metallic stator. Alternatively, the motor may comprise a rotating electric motor having a rotating armature driving a gear set so that rotary motion of the armature will be converted into vertical movement of the roadwheel and tire assembly with respect to the chassis. As before, the armature may comprise either a permanent magnet or a winding. A suspension according to this invention further comprises a source of electrical energy connected with the control means and with the electric motor so that the energy source will both supply energy to the first load bearing means and absorb energy therefrom when the motor is operated regeneratively.

In a second embodiment, an electrically powered active suspension for a vehicle according to the present invention comprises a roadwheel and tire assembly, a suspension unit comprising first and second load bearing means interposed between the roadwheel and tire assembly and the chassis of the vehicle, with the first means being electrically powered, and control means for operating both load bearing means so as to control the vertical movement of the wheel and tire assembly with respect to the chassis. A suspension according to this embodiment further comprises a source of electrical energy connected with the control means and with the first load bearing means so that the energy source will both supply energy to the first load bearing means and absorb energy therefrom when the motor is operated regeneratively. As with the first embodiment, the electric motor employed in the first load bearing means may comprise a rotating motor having a rotating armature driving a gearset so that rotary motion of the armature will be converted into vertical movement of the roadwheel and tire assembly with respect to the chassis, with the second load bearing means comprising a fluid spring, or some other type of adjustable spring mounted about the motor and gearset. As before, the first load bearing means could comprise a linear electric motor operated by the system controller and having a plunger and a stator interposed between the chassis of the vehicle and the wheel and tire so that sliding movement of the plunger with respect to the stator will be accompanied by vertical movement of the roadwheel and tire assembly with respect to the chassis. Finally, the linear motor may be combined with a second load bearing means comprising an adjustable spring which could, for example, comprise a fluid spring. The motor used in either type of the second embodiment of the present invention could comprise any of the examples discussed in connection with the first embodiment.

A third embodiment of an electrically powered active suspension according to the present invention may comprise a roadwheel and tire assembly, a suspension unit comprising first and second load bearing means interposed between the roadwheel and tire assembly and the chassis of the vehicle, with the first means being electrically powered and the second means comprising a coil spring, and control means for operating both load bearing means so as to control the vertical movement of the wheel and tire assembly with respect to the chassis.

A control means or system useful for practicing the present invention could comprise height sensing means for determining the ride height of the vehicle corresponding to the vertical distance separating the roadwheel and the chassis as well as means for generating ride height signals corresponding to such ride height, and load sensing means for sensing the load-carrying forces generated by each of the load bearing means and for generating signals corresponding to such forces. Finally, the control means could further comprise load apportionment means, responsive to said load and height sensing means, for determining the relatively variant and relatively invariant components of the loads and for adjusting the fraction of the total load which is carried by each of the load bearing means, in the event that first and second load bearing means are employed. The load sensing means may comprise load cells interposed between the chassis and each of the load bearing means. Alternatively, the load sensing means for the motor driven load bearing means may comprise a system for sensing the motor currents and for converting the sensed currents into motor force or torque. The height sensing means may comprise first and second sensor components which may for example comprise sensors such as a linear variable differential transformer (LVDT) interposed between the chassis and roadwheel and tire assembly such that the vertical motion of the roadwheel and tire with respect to the chassis will be accompanied by motion of the sensor components with respect to each other.

A load apportionment means according to the present invention may comprise means for producing force commands corresponding to forces to be produced by each of the load bearing means, where each of the load bearing means is adjustable, and comparator means for comparing the commanded forces with the actual forces produced by the load bearing means and for producing an error signal from said comparison, with said error signal being fed to an adjustment means for adjusting the force commands so that the force commands will cause such actual forces to equal said commanded forces. The force adjustment means preferably comprises means for producing a desired force signal by transforming said error signal into a signal having components which are proportional to the magnitude of the error signal and to its time derivative and time integral. Alternatively, the desired force signal may be produced by transforming the error signal according to other known control methods. The load apportionment means may further comprise means responsive to the height signals for determining the relative vertical velocity of the roadwheel with respect to the chassis and means for directing the first load bearing means to operate as a generator supplying energy to the energy source in the event that the direction of the force command at any particular time and the direction of the relative vertical velocity at the same time are opposite, but directing the first load bearing means to operate as a motor in the event that the directions of said velocity and said force command are the same.

A system according to the present invention may preferably be operated such that the apportionment means produces force commands which result in the forces being produced by the load bearing means being approximately the same as the relatively invariant component of the load. This will minimize the force inputs by the suspension system to the vehicle's chassis. This aspect of the present invention will work as follows. With a vehicle weighing, for example, 4000 lbs., and with the weight distributed evenly to four roadwheels, each roadwheel and its strut or other attaching hardware must support 1000 lbs. of static weight. Now, if the force exerted by each suspension unit upon the chassis of the vehicle is controlled such that the vehicle is maintained at the desired attitude, with the sum of the forces from all four wheels approximating 4000 lbs. at all times, notwithstanding road surface imperfections, turning maneuvers, braking, or other operating conditions, the vehicle body and chassis will ride in a smooth, acceptable manner. It is an object of the present system to minimize variations in the force inputs to the vehicle chassis so as to achieve such a smooth ride.

A load apportionment means according to the present invention may thereby be viewed as producing force commands at each wheel according to the steps of (i) sensing the load carrying force produced by each of the load bearing means; (ii) determining force commands for achieving some performance measure such as maintaining the sum of the load carrying forces produced by the load carrying means at a value having a magnitude approximating that of the relatively invariant load component; and (iii) directing the load bearing means to produce the determined force commands. The control means may preferably adjust both load bearing means such that the second load bearing means will carry the relatively invariant load component supported by the suspension.

BRIEF DESCRIPTION OF THE DRAWINGS

FIG. 3 is a partially schematic diagram of a MacPherson strut suspension according to the present invention including both electrically powered and coil spring load bearing means.

FIG. 7 comprises a graphic illustrating operation of a system according to the present invention in both power absorbing and regenerative modes.

DESCRIPTION OF THE PREFERRED EMBODIMENTS

Figure 1:
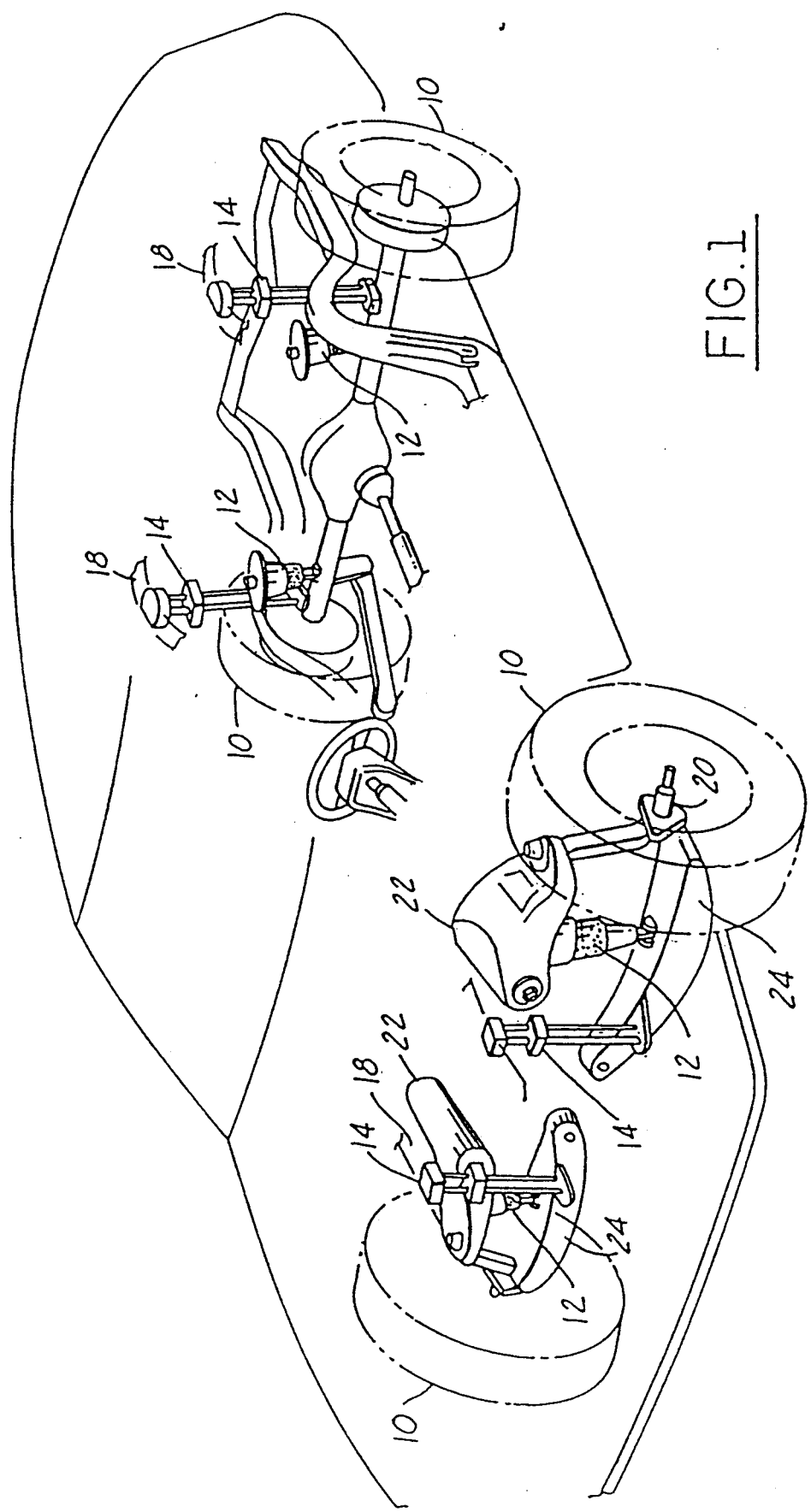
FIG. 1 is a perspective view of a vehicle having an electrically powered active suspension system according to the present invention. This figure shows only a portion of the system, but includes the four suspension units.

As shown in FIG. 1, a vehicle having an electrically powered active suspension according to the present invention will generally be equipped with a plurality of roadwheel and tire assemblies, 10, which are controlled by means of suspension units 12. As is further shown in FIG. 1, each front suspension unit is mounted resiliently between chassis 18 and a lower control arm, 24. Roadwheel and tire assembly 10 is journaled upon spindle 20, which is pivotally attached to the outboard ends of control arms 22 and 24. The inboard ends of the control arms are pivotally attached to chassis 18. FIG. 1 further shows the placement of four LVDT units, 14, in proximity to each of roadwheels 10. The LVDT units comprise height sensing means interposed between chassis 18 and roadwheel and tire assemblies 10 such that vertical motion of the roadwheel with respect to chassis 18 will be accompanied by motion of the sliding sensor components with respect to each other. In this manner, sensors 14 may be used to keep track of the vertical location of the roadwheel and tire assemblies vis-a-vis the chassis of the vehicle. Those skilled in the art will appreciate in view of this disclosure that other types of roadwheel vertical position sensors such as rotary Hall Effect or yet other types of linear or rotary resolver devices may be applied to a system according to the present invention. It will be further appreciated that a system according to the present invention could be employed not only with the parallel arm and MacPherson strut and beam axle combinations illustrated herein, but also with other types of suspensions either known in the art or suggested by this disclosure.

Figure 2:
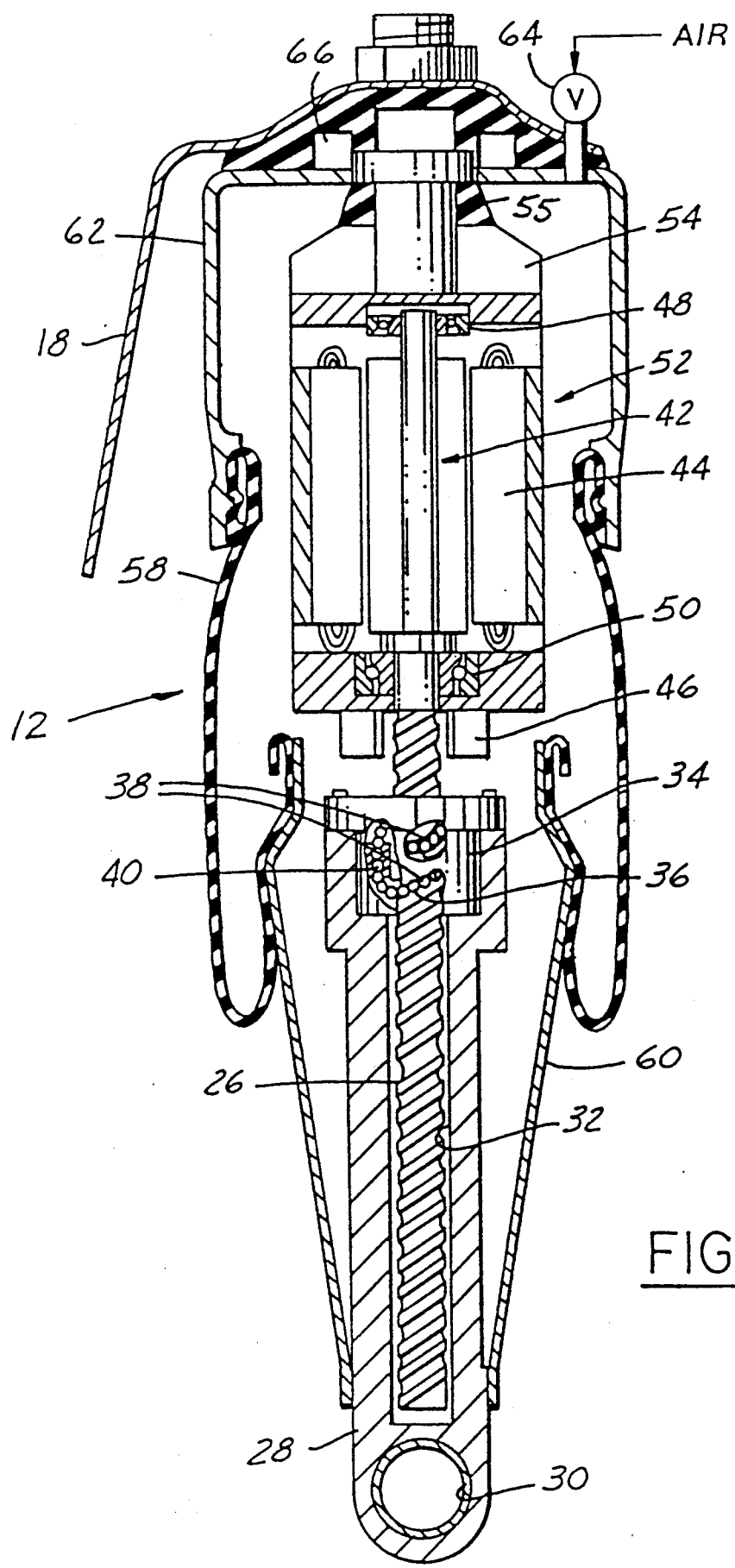
FIG. 2 is a partially schematic diagram of a suspension unit according to the present invention including both rotary electric powered and fluid powered load bearing means.

FIG. 2 illustrates details of the electrically powered suspension unit shown in FIG. 1. Beginning at the lower end of suspension unit 12, lower casing 28 has a mounting eye, 30, for attaching the suspension unit to lower control arm 24 as shown in FIG. 1. Lower casing 28 contains a clearance bore, 32, providing a space for ball screw 26 to run longitudinally. Ball screw 26 interacts with ball nut 34, which has two ball passages 38 formed therein. A plurality of balls 36 circulates through passages 38 as well as through return passage 40. Details of a plural lead ball nut screw actuator suitable for practicing the present invention are shown in U.S. Pat. No. 4,211,125, which is hereby incorporated by reference into this specification. It will be appreciated by those skilled in the arts to which this invention pertains that the ball nut and ball screw, cooperating together, form a channel which may be likened to the channel formed by the inner and outer races of a bearing, with the balls providing rolling contact between the ball screw and ball nut. Accordingly, when the ball screw is rotated, the length between the upper and lower portions of suspension unit 12 will be either increased or decreased. It will be further appreciated that other types of gear or screw drives may be useful for practicing the present invention.

Figure 5:
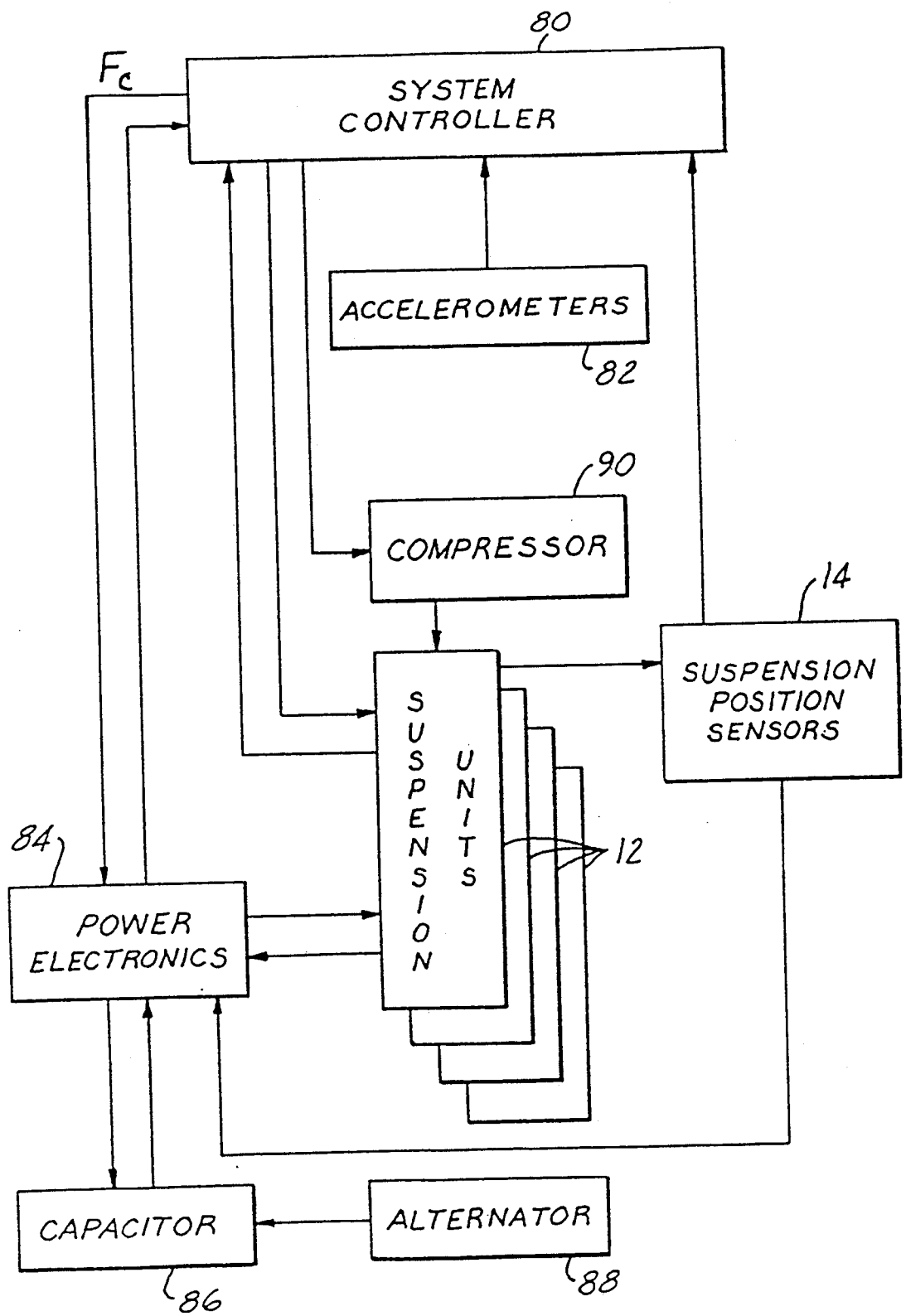
FIG. 5 comprises an overall system block diagram of an electrically powered active suspension according to the present invention.

The ball screw of the suspension unit shown in FIG. 2 is rigidly attached to armature 42 of an electric motor, 52, so that rotation of the motor will cause rotation of the ball screw and, concomitantly, extension or retraction of suspension unit 12. Armature 42 rotates in upper bearing 48 and lower bearing 50, which are shown as being of the angular contact type, but which could be configured according to other designs known to those skilled in the art and suggested by this disclosure. Motor stator 44 envelops a portion of armature 42 and is connected to power electronics 84 (FIG. 5). The motor shown in FIG. 2 is of the brushless type, having electronic commutation. Accordingly, optical encoder 46 is provided for advising power electronics circuit 84 of the precise rotary location of armature 42. Those skilled in the art will appreciate that other types of encoders or position resolvers may be employed for the purpose of providing position information needed for electronic commutation purposes. An example of a magnetic position encoder is the model EK500 encoder by Electro-Kinesis, Inc. TM, a Superior Electric Company.

It has been determined that a General Electric ECM TM six pole surface permanent magnet motor using MQ-3 Nd-B-Fe magnets may be useful for practicing the present invention. As previously noted, the present invention may be practiced with permanent magnet, induction, variable reluctance, or synchronous motors, or yet other types of motors suggested by this disclosure. These motors may employ a variety of architectures. For example, although the synchronous motor and one variety of the induction motor will employ a wound stator and a wound rotor for both the rotary and linear embodiments, either component of the permanent magnet motors may be wound, as may either component of the variable reluctance motor. With the variable reluctance motor, the winding is opposed by a slot/tooth element comprising the rotor or stator. Finally, the induction motor may comprise not only fully wound designs but also designs in which the stator is wound and the rotor or plunger comprises a known squirrel cage element.

The load carrying force produced by motor 52 via the ball nut and screw combination is sensed by motor load cell 54, which is mounted between the end case of the motor and the upper portion of suspension unit 12. Load cell 54 bears upon isolator 55, which is interposed between chassis 18 and motor load cell 54.

The suspension unit of FIG. 2 has not only an electrically powered load bearing means but also a fluid powered load bearing means comprising a fluid spring mounted about the motor and gearset. The fluid spring comprises rolling lobe airspring 58, which interacts with piston 60, which is in turn attached to the lower end of lower casing 28. The upper end of rolling lobe air spring 58 is attached to upper housing 62. Load bearing forces generated by air spring 58 are thus transmitted into the lower casing 28 and upper housing 62. The amount of such force is sensed by means of pneumatic spring load cell 66, which is interposed between upper housing 62 and chassis 18. Thus, it will be understood that the two load cells 54 and 66, which are connected to system controller 80 (FIG. 5), allow system controller 80 to determine the load carrying forces generated by the pneumatic and electric devices so that the fraction of the total load which is carried by each of the load bearing means may be adjusted. Alternatively, means may be provided for monitoring the control currents supplied to the electric motor and combined with means for converting such currents into a signal having a value which is proportional to the force exerted by said motor.

The load carrying force exerted by airspring 58 is proportional to the pressure of air contained within the airspring. Accordingly, the airspring is provided with air through valve 64 which is in turn connected with air compressor 90 (FIG. 5).

FIG. 3 illustrates an alternate construction for the strut portion of a suspension system according to the present invention. FIG. 3 illustrates the well-known MacPherson construction in which the lower end of suspension unit 12 is rigidly attached to spindle 20 upon which roadwheel and tire assembly 10 is journaled. Control arm 24 is pivotally attached between suspension unit 12 and chassis 18. The suspension unit of FIG. 3 has a coil spring, 16, mounted about the electrically powered portion of the strut, which may comprise either a rotary or a linear electric motor as described herein. It is possible to apportion the load between the coil spring and the motor driven unit by changing the ride height of the vehicle.

Figure 4:
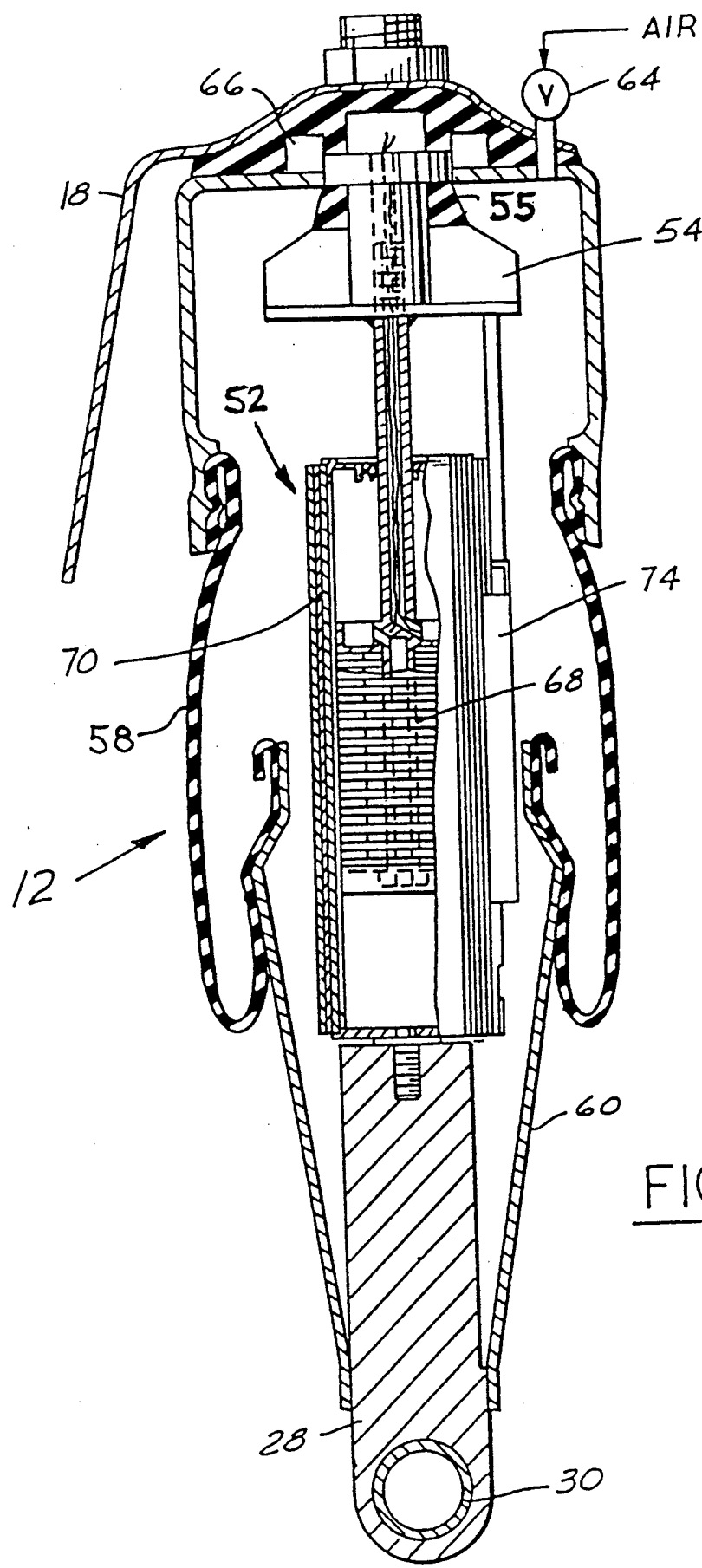
FIG. 4 is a partially schematic diagram of a suspension unit according to the present invention including both linear electric powered and fluid powered load bearing means.

FIG. 4 illustrates a linear motor incorporated into a suspension unit according to the present invention. Several of the reference numerals in FIG. 4 correspond to like structures in FIG. 2. The motor shown is an induction motor in which only plunger 68 is wound, with hollow stator 70 comprising a conductive metallic structure which carries induced currents. Force in an induction motor is caused by the interaction between an applied magnetic field in one member (in this case, the plunger), and currents induced in the conductor of a second member on the other side of a separating air gap. Plunger 68 is attached at its upper extremity to chassis 18 and comprises lamination packs, steel coils, magnet wire coils, end caps, and a shaft. The plunger is slidably carried within stator 70, which is attached to mounting eye 30, and which comprises a bimetallic tube, having an aluminum inner surface and a steel outer surface. The two sleeves are assembled and then the inner bore is honed for straightness. The suspension unit of FIG. 4 further includes resolver 74, which keeps track of the position of the motor for commutation purposes. As with the unit illustrated in FIG. 2, an air spring, 58, is included, as is valve 64 for admitting compressed air into the air spring.

The suspension unit shown in FIG. 4 may be integrated in the suspension shown in FIG. 1 by substituting the linear device of FIG. 4 for the rotary motor powered device of FIG. 2. The plunger and resolver are each wired to system controller 80 and power electronics module 84. The linear and rotary motor embodiments disclosed herein may both be controlled according to a scheme set forth below.

Operation of a system according to the present invention will be explained with reference to FIGS. 5, 6, and 7. As shown in FIG. 5, system controller 80 communicates with and is operatively connected with several of the other components of a system according to this invention. Accordingly, system controller 80 is interconnected with power electronics module 84, as well as with suspension units 12, accelerometers 82, height sensors 14, and air compressor 90. Those skilled in the art will appreciate in view of this disclosure that air compressor 90 and rolling lobe airspring 58 are merely intended to be exemplary of a class of devices comprising fluid power units. Other types of such units could be used in a system according to the present invention, including but not limited to hydro-pneumatic, or even low-powered hydraulic devices.

System controller 80 comprises a microprocessor controller and appropriate input and output devices including analog to digital and digital to analog converters. The microprocessor preferably comprises a read only memory (ROM) for storing various constants and control programs for controlling the suspension system. The microprocessor further includes a central processing unit (CPU) for reading out control programs from the ROM so as to execute required operations, and a random access memory (RAM), which temporarily stores various data related to the operations to be executed within the CPU, and which allows the CPU to read out the data stored therein. The microprocessor further includes a clock generator which generates clock pulses in response to which the operations are executed in the microprocessor. Those skilled in the art will appreciate in view of this disclosure that the present invention may be practiced with the aid of several different types of microprocessors manufactured by several different companies.

At least one of the control programs stored within the ROM of system controller 80 comprises an outer loop control for determining the desired force from each suspension unit. Using information from the accelerometers, height sensors, and other vehicular sensors, the outer loop will calculate a desired force, $F_c$, for each suspension unit. As an example, the force may be determined as that force which is composed of the following terms:

$$F_c = k_1 x_1 + k_1 x_2 + k_3 x_3 + k_4 x_4 + k_5 x_5$$

where:
  $x_1$-$x_5$ are nondimensional representations of the vertical acceleration of the vehicle body or chassis; tire deflection; the distance between the suspension jounce stops; and chassis pitch and roll, respectively; and
  $k_1$-$k_5$ are weighting factors having values which can either be fixed or changeable with the operating mode of the vehicle. For example, on a smooth road with straight line driving, it may be desirable to set $k_1 = 1$ and each of $k_2$-$k_5 = 0$ in order to give the best possible ride.

FIG. 7 shows various plots characterizing operation of a system according to the present invention. Each of the plots in FIG. 7 has been marked with an identification numeral in the range I-IV. Each of the plots is divided into a right and left section. The left sections correspond to a situation in which the roadwheel comes into contact with a bump protruding from the roadway surface. The right sections correspond to a situation in which the roadwheel initially falls into a depression such as a pothole, and then runs up out of the depression.

Plot I illustrates roadwheel position, with the ordinate designating the ride height position. Accordingly, the ordinate is marked "jounce" to indicate movement of the roadwheel up into the chassis, and "rebound" to indicate movement of the roadwheel away from the chassis. In the event that the roadwheel strikes an obstacle extending above the normal elevation of the roadway—e.g., a parking lot bumper, the wheel will move upwardly i.e., in the jounce direction, so as to move closer to the chassis. This is shown in the left portion of I of FIG. 7. Upward movement of the wheel will be accompanied by an increase in the load carrying force generated by fluid spring 58. This is shown in the left portion of plot II of FIG. 7. Note that the static load borne by air spring 58 is shown as an offset from the abscissa of plot II. As is noted by plot II, the fluid spring force generally follows wheel position. It has thus been assumed that force generated by air spring 58 is a linear function of the relative displacement between roadwheel 10 and chassis 18. To the extent that this is not the case with any particular air spring, plot II would merely have a different characteristic. The left portion of FIG. 7 labeled III illustrates the electric motor force produced by a suspension unit according to the present invention. Note that the force begins at a zero level at the abscissa. Accordingly, fluid spring 58 is being employed for the purpose of carrying the relatively invariant load component supported by the suspension. In other words, the static load which must be supported by the suspension units is being supported by air spring 58. This allows the electrically powered portion of suspension unit 12 to handle only the relatively variant portion of the load imposed upon the suspension units. Accordingly, plot III shows that electric motor force starts at the abscissa at zero force and builds along with the force buildup in air spring 58. Conversely, as the force buildup within air spring 58 decreases to the static load condition, the electric motor force decreases concomitantly. As is further shown in the left portion of plot III of FIG. 7, the region under this plot illustrates energy absorbed by the motor of the suspension unit and energy supplied by the motor of the suspension unit to the electrical power source when the motor is operating in the regenerative mode.

It will be noted that in the region labeled "A" of the left segment of plot III, power is being absorbed from the electrical power source by the motor and converted to mechanical work. This occurs because the force being generated by the motor and the motion of the motor are in the same direction. In other words, in the region of the curve labeled "A", the motor is being used to pull the roadwheel and tire assembly up against both the force of air spring 58 and the force of gravity. Conversely, in the region labeled "B" of the left portion of III, the motor is being used to oppose both the force of spring 58 and the force of gravity tending to push the road wheel downwards. In other words, the motor is being operated as a generator to convert the energy which was stored in airspring 58 and in gravitational potential energy when the wheel moved in the jounce direction into electrical energy which may be either used immediately or stored for future use. This conversion of energy stored in the spring comprises the essence of regenerative operation for this embodiment of the present invention. In the event that only an electrically powered device is used in the suspension unit, the weight of the roadwheel and tire assembly and the weight of the hardware which attaches the roadwheel to the suspension unit will provide a downwardly directed force which may be utilized to remove energy from the suspension system regeneratively. It will be appreciated that the total amount of energy which is available for removal regeneratively will generally not equal the total energy put into the system by the electric motor because of losses arising from friction, inertia, and electrical transmission losses. It should be noted that the areas identified under plot III cannot be correlated to the amount of energy transferred by means of the suspension unit because the abscissa of plot III corresponds to time and not displacement. Nevertheless, plot III does indicate the magnitude and direction of the forces being exerted by the motorized part of the suspension unit.

Plot IV of the left portion of FIG. 7 illustrates the net force on the vehicle's body or chassis resulting from operation of suspension unit 12 during the roadwheel's encounter with an object in the roadway. Note that the force line is almost flat, indicating that an almost constant force, approaching the static force required to support the vehicle, acts upon the vehicle body. As a result, the occupants of the vehicle will enjoy a smooth ride free from undesirable road inputs.

As described above, the right portion of FIG. 7 illustrates an example wherein the roadwheel falls into a depression in the roadway surface. Accordingly, plot I shows the roadwheel moving in the rebound direction and then back up into the nominal ride height position. The force developed by air spring 58 tracks the ride height excursion (plot II). As before, electric motor force is shown in plot III. Note however, that the portions of plot III showing energy absorbing and regenerative operation are reversed in the left and right portions. This phenomenon occurs because as the roadwheel moves downwardly into the hole, the motor exerts a force in the upward direction; as a result, the motor is driven regeneratively. When the roadwheel starts to move upwardly once the end of the hole has been reached, the motor will pull the roadwheel upwardly so as to avoid putting force into the chassis. This corresponds to the "A", or energy absorption part of the curve shown in the right part of plot III. Finally, the net force plot for the present example indicates that very little force has been imparted to the body.

Turning now to FIG. 5, but with continuing reference to FIG. 7, in the event that the roadwheel and tire assembly strike an obstruction corresponding to the left portion of FIG. 7, system controller 80 will measure a force increase by means of motor load cell 54 and pneumatic spring load cell 66. In other words, the load cells will sense greater forces acting upon the chassis, with the forces being transmitted by the pneumatic and electric load bearing devices. Upon sensing increased loading, system controller 80 will give a command to power electronics module 84 to actuate suspension units 12 so as to counteract the force build-up produced within air spring 58 by lifting the roadwheel. Power will then be supplied to the suspension units by means of capacitor 86 which is operatively connected with power electronics module 84 (FIG. 5) and which is in turn supplied with power by means of alternator 88 which is driven by the engine of the vehicle. Alternatively, the output of alternator 88 could be augmented by means of a storage battery. In the event that the vehicle does not possess an engine, alternator 88 could be replaced entirely by means of a storage battery. Although capacitor 86 has been shown as comprising a single unit, for certain applications of a system according to the present invention it may be desirable to use a plurality of high volumetric efficiency capacitors, with one such capacitor located in proximity to each suspension unit.

System controller 80 will be able to determine the relatively variant and relatively invariant components of the loads imposed upon suspension units 12 by tracking the load magnitude as a function of time. Once the invariant fraction of the load has been resolved, air spring 58 may be commanded to produce this portion of the load, thereby freeing the electric motor for the task of handling dynamic suspension loads.

Returning now to FIG. 7, in the event that the load upon air spring 58 is increased as in plot II of FIG. 7, system controller 80 will give a signal to power electronics module 84 to cause the electric motor of the strut to counteract such force. A force command will be given to suspension unit 12, subject to feedback from height sensors 14 that an insufficient amount of stroke remains in the suspension unit. In other words, if height sensors 14 indicate that the suspension unit is coming into the full jounce position, system controller 80 will give an artificial jounce bumper command to power electronics 84 so as to greatly decrease the amount of force developed by the motor, thereby preventing the suspension unit from crashing into the full jounce position.

From the foregoing explanation, it will be understood that the system controller functions not only as a load apportionment means, responsive to the load cells and height sensors, for determining the relatively variant and relatively invariant components of the loads, but also as means for adjusting the fraction of the total load carried by each of the load bearing components of the strut. As will be explained more fully in connection with FIG. 6, system controller 80 and power electronics module 84 together comprise means for producing force commands corresponding to the forces to be produced by each of the load bearing means and comparator means for comparing the commanded forces with the actual forces sensed by the load cells so as to produce an error signal which is then used to recalculate new force commands so as to cause the actual forces produced by the suspension unit to equal the commanded forces. The system controller may apply a proportional-integral-derivative (PID) type of control to the error signal to transform the error signal into a corrected force signal. The well-known PID control method generates an output signal which is proportional to the magnitude of the error signal and to its time derivative and time integral. The PID control method represents but one of several different control schemes which could be employed with a system according to the present invention.

The relatively invariant portion of the vehicle load imposed upon any particular suspension unit 12 will normally be borne by means of air spring 58. This is accomplished whenever system controller 80 either signals air compressor 90 to supply air by means of valve 64 to air spring 58, or to bleed air from air spring 58 so as to bring the ride height within the nominal setting. Accordingly, the electrically powered portion of suspension unit 12 will not be relied upon to provide what is analogously to electronic theory, the "DC" portion of the load.

In the event that, notwithstanding the precise load carrying characteristics of a suspension unit according to the present invention, the vehicle has a vertical velocity detectable by means of one or more of accelerometers 82, (FIG. 5), a modified control scheme will be employed for the purpose of damping such vertical motion of the chassis. This modified algorithm will operate by causing suspension units 12 to exert forces on the body which are in the opposite direction of the body velocity at any given moment. In other words, if the body is moving in the downward direction, the suspension units will be commanded to exert a force in an upward direction so as to damp the body movement.

Figure 6:
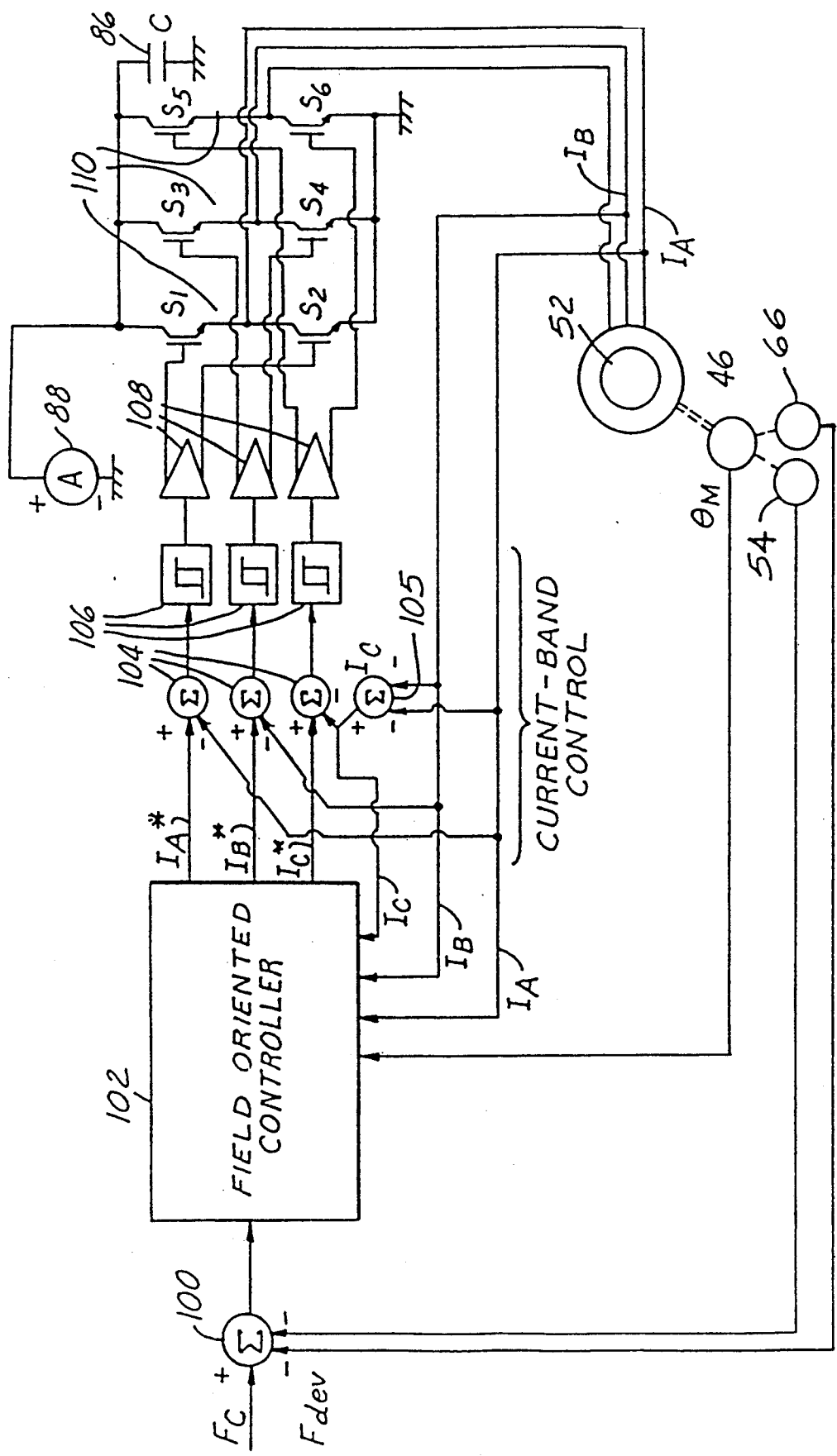
FIGS. 6 and 6A comprise a schematic showing the power and control electronics incorporated into a system according to the present invention.
Figure 6A:
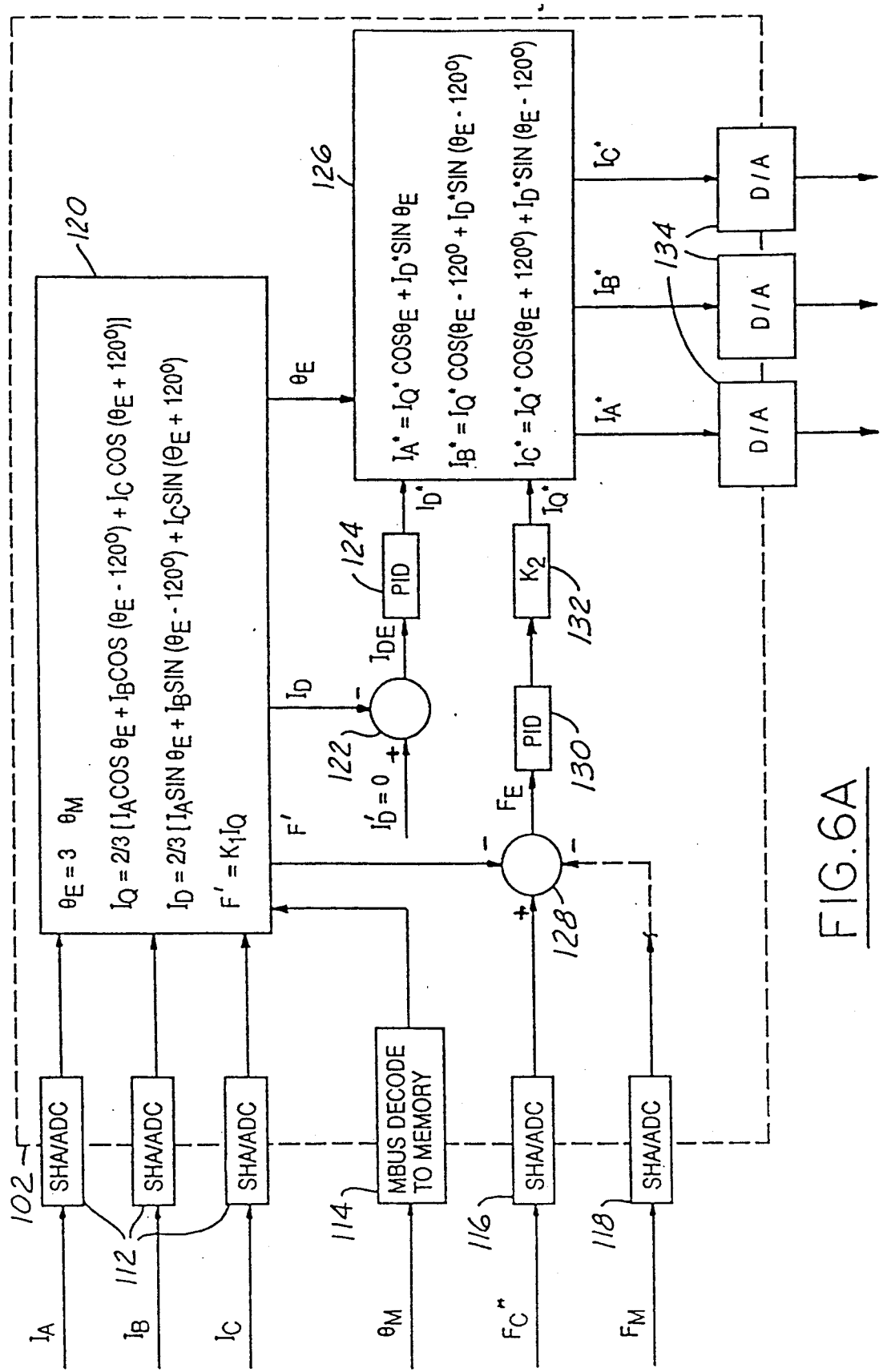

FIG. 6 illustrates certain details of a power electronics module useful for implementing a system according to the present invention. FIG. 6A illustrates additional details of the structure of FIG. 6, including the structure of the field oriented controller contained in FIG. 6.

Returning for the moment to FIG. 5, it is seen that power electronics module 84 receives force commands, $F_c$, from system controller 80. The power electronics module is given the task of supplying the correct phase currents to motor 52, so as to produce the forces specified by system controller 80.

Turning to FIG. 6, summer or comparator 100 marks the point at which command force, $F_c$, which is the commanded force from system controller 80, is added to or in other words, compared with $F_{dev}$. As shown in FIG. 6, $F_{dev}$ is the measured force output derived from load cells 54 and 66 or derived in part by the system controller, using motor current information. The output of comparator 100 is sent to field oriented controller 102, which will be described in detail with reference to FIG. 6A. The purpose of field oriented controller 102 is to calculate appropriate phase currents to feed to each of the three phase legs 110 which supply the phase currents to motor 52.

In addition to the previously described inputs, field oriented controller 102 also receives data from rotor position sensor 46, which in this case comprises the previously described optical encoder. Finally, field oriented controller 102 senses the currents in the individual motor windings. Although only the currents $I_A$ and $I_B$ are shown as being sensed directly, with the third current, $I_C$, being derived from currents $I_A$ and $I_B$ by comparator 105 as the negative of the sum of $I_A$ and $I_B$, those skilled in the art will appreciate in view of this disclosure that it is possible to directly measure all three of the phase currents as an alternative to the use of comparator or summer 105.

Field oriented controller 102 calculates the desired phase currents $I_A^*$, $I_B^*$, and $I_C^*$. These idealized phase currents are compared by means of comparators 104 to each of the measured phase currents $I_A$, $I_B$, and $I_C$ respectively. The error for each current is then fed to current mode controllers 106 The function of the current mode controllers is to switch phase currents on and off, provided a predetermined hysteretic current level has been satisfied. It has been determined that model CS320 current mode controllers by Cherry Semiconductor will be useful as device 106. The outputs of the current mode controllers are fed to drivers 108, which supply gate charges for the purpose of switching transistors S1-S6.

Transistors S1 and S2, S3 and S4, S5 and S6, which are labeled 110 in FIG. 6, comprise, respectively, phase legs for supplying three separate phase currents to motor 52. Each of transistors S1-S6 comprises an insulated gate bipolar transistor (IGBT). Those skilled in the art will appreciate that other types of semiconductor devices such as MOSFET or MCT devices could be employed in lieu of the illustrated IGBT units. It has been determined that pairs of IGBTs supplied as phase leg modules by MOSBLOC, Inc. in their Motor Drive Series, will be useful for implementing a circuit according to the present invention. The outputs of the phase leg modules are fed directly to motor 52.

Turning now to FIG. 6A, the dotted area of the figure which is labeled 102 and which corresponds to the field oriented controller, comprises a digital computer. It has been determined that a Ford Motor Company EEC-IV controller, which utilizes an Intel model 8061 microprocessor, will be useful for practicing the present invention. Phase currents $I_A$, $I_B$ and $I_C$ are shown as entering field oriented controller 102 at combination sample and hold amplifier and analog to digital converters (SHA/ADC) 112. The digital equivalents of the phase currents are used at block 120 of FIG. 6A in various equations for calculating $I_Q$ and $I_D$, which are the quadrature and direct axis equivalent currents for motor 52. $I_Q$ is used further for calculating F', which is the estimated developed force. The equation for F' is shown in block 120. As an alternative to calculating F', the measured force from the load cells 54, 66 may be entered by means of SHA/ADC 118.

The equation calculation block shown at 120 in FIG. 6A receives further inputs from optical encoder 46 or another type of motor position sensor in the form of $\theta_M$ which is fed to MBUS decoder device 114. Finally, force commands from system controller 80 are fed into calculational scheme by means of SHA/ADC 116.

As set forth in block 120, the computer calculates $\theta_E$ which is the electrical rotor angle corresponding to the mechanical rotor angle, $\theta_M$, as well as $I_Q$, $I_D$, and F', which have previously been discussed.

Having made the calculations in block 120, computer compares $I_D$ to $I_D'$, which is set equal to zero by means of comparator 122, but only in the event that motor 52, in the rotating embodiment illustrated in FIG. 2, is a permanent magnet motor. $I_D'$ could be non-zero for other implementations such as with a linear induction motor. The result of the comparison, $I_{DE}$, is then modified by PID controller 124. This controller essentially comprises an integrator and a proportional multiplier. The desired current $I_D^*$ is the output of PID controller 124. In an ideal situation it would be possible to perform the current comparison and tracking without using a PID compensator. However, due to finite non-zero time constants involved in motor 52, the response to the phase currents is not instantaneous and the PID utilizes the error so as to enhance the responsiveness of the system. In similar fashion, the estimated developed force F' is compared to the force command by comparator 128 and the error is fed through PID 130 and then converted to $I_Q^*$ by means of a multiplication operation at block 132. Those skilled in the art will appreciate that PID 124 and PID 130 could be supplanted by other types of control strategies known in the art and suggested by this disclosure. At block 126, a reverse transformation process translates $I_D^*$ and $I_Q^*$ into desired line currents $I_A^*$, $I_B^*$ and $I_C^*$. Finally, digital to analog converters 134 are employed for converting digital signals $I_A^*$, $I_B^*$ and $I_C^*$ into analog signals for feeding to comparators or summers 104 (FIG. 6).

As noted in FIG. 6, the combination of comparators 104 and current mode controllers 106 comprise a current band or hysteresis controller relying on the feedback of the three stator currents to minimize introduction of DC currents in the motor. This will minimize torque pulsation in the suspension unit.

From the foregoing, it is seen that a system according to the present invention senses the load carrying force produced by each of the load bearing means employed therein, and determines force commands by maintaining the sum of the load carrying forces produced by the load bearing means at a value having a magnitude approximating that of the relatively invariant load component. These force commands will be distributed to various suspension units so that the desired load forces may be developed.

Various modifications will no doubt occur to those skilled in the arts to which this invention pertains. For example, certain functions of the microprocessors described herein could be performed by conventional switching circuits or other conventional control devices. Further, the choice of a particular suspension in which to employ a system according to present invention is left to the individual designer. All such modifications and variations which basically rely upon the teachings with which this disclosure has advanced the art are properly considered to be within the scope of this invention, as defined by the appended claims.

What is claimed is:

1. A field oriented controller for generating phase currents for driving a multiple phase electric motor in response to a commanded force signal, said controller generating phase currents to substantially conform the force developed by the motor to the force indicated by said commanded force signal and comprising:
   current signalling means for determining the currents flowing in the individual phases of said motor;
   motor monitoring means for determining the mechanical rotary position $\theta_M$ of an armature of said motor;
   processor means for determining the electrical rotary position $\theta_E$ of the armature of said motor from its mechanical rotary position $\theta_M$ and for transforming the phase currents determined by said current signalling means into a quadrature axis equivalent current, $I_Q$, and a direct axis equivalent current, $I_D$;
   comparator means for comparing said commanded force signal with a motor force signal representative of the actual force generated by said motor to generate a force error signal;
   first converter means for converting said direct axis equivalent current $I_D$ into a desired direct axis equivalent current $I_D^*$; and
   second converter means for converting said force error signal into a desired quadrature axis equivalent current $I_Q^*$, said processor means further providing for calculating the phase currents, $I_A^*$, $I_B^*$, $I_C^*$, for driving said motor, as a function of $\theta_E$, $I_D^*$ and $I_Q^*$.

2. A field oriented controller for generating phase currents for driving a multiple phase electric motor as claimed in claim 40 wherein said processor means further provides for estimating said motor force signal as a function of said quadrature axis equivalent current, $I_Q$.

3. A field oriented controller for generating phase currents for driving a multiple phase electric motor as claimed in claim 2 wherein said motor force signal is estimated by multiplying said quadrature axis equivalent current, $I_Q$, by a constant, $K_1$.

4. A field oriented controller for generating phase currents for driving a multiple phase electric motor as claimed in claim 1 further comprising force output sensing means coupled to said motor for generating said motor force signal.

5. A field oriented controller for generating phase currents for driving a multiple phase electric motor as claimed in claim 1 wherein said first converter means comprises a PID controller.

6. A field oriented controller for generating phase currents for driving a multiple phase electric motor as claimed in claim 5, wherein said first converter means further comprises comparator means for comparing said direct axis equivalent current, $I_D$ to a commanded direct axis equivalent current, $I_D'$.

7. A field oriented controller for generating phase currents for driving a multiple phase electric motor as claimed in claim 1 further comprising digital to analog converter means for converting said phase currents, $I_A^*$, $I_B^*$, $I_C^*$, from digital signals to analog signals.

8. A field oriented controller for generating phase currents for driving a multiple phase electric motor as claimed in claim 1 wherein said processor means determines the electrical rotary position $\theta_E$ of the armature of said motor from its mechanical rotary position $\theta_M$ by solving the equation, $\theta_E = P/2(\theta_M)$, where P is the number of motor poles, and transforms the phase currents determined by said current signalling means into a quadrature axis equivalent current, $I_Q$, and a direct axis equivalent current, $I_D$, by solving the equations, $I_Q = \frac{2}{3}\{I_A\cos\theta_E + I_B\cos(\theta_E - 120°) + I_C\cos(-\theta_E + 120°)\}$ $I_D = \frac{2}{3}\{I_A\sin\theta_E + I_B\sin(\theta_E - 120°) + I_C\sin(-\theta_E + 120°)\}$.

9. A field oriented controller for generating phase currents for driving a multiple phase electric motor as claimed in claim 8 wherein said processor means calculates the phase currents, $I_A^*$, $I_B^*$, $I_C^*$, for driving said motor by solving the equations, $I_A^* = I_Q^*\cos\theta_E + I_D^*\sin\theta_E$ $I_B^* = I_Q^*\cos(\theta_E - 120°) + I_D^*\sin(\theta_E - 120°)$ $I_C^* = I_Q^*\cos(\theta_E + 120°) + I_D^*\sin(\theta_E - 120°)$.

10. A field oriented control method for generating phase currents to drive a multiple phase electric motor in response to a commanded force signal, said control method generating phase currents to substantially conform the force developed by the motor to the force indicated by said commanded force signal and comprising the steps of:
   determining the currents flowing in the individual phases of said motor;
   sensing the mechanical rotary position $\theta_M$ of an armature of said motor;
   determining the electrical rotary position $\theta_E$ of the armature of said motor from its mechanical rotary position $\theta_M$;
   transforming the phase currents flowing in the individual phases of said motor into a quadrature axis equivalent current, $I_Q$, and a direct axis equivalent current, $I_D$;
   comparing said commanded force signal with a motor force signal representative of the actual force generated by said motor to generate a force error signal;
   converting said direct axis equivalent current $I_D$ into a desired direct axis equivalent current $I_D^*$;
   converting said force error signal into a desired quadrature axis equivalent current $I_Q^*$; and
   calculating the phase currents, $I_A^*$, $I_B^*$, $I_C^*$, for driving said motor, as a function of $\theta_E$, $I_D^*$ and $I_Q^*$.

11. A field oriented control method for generating phase currents to drive a multiple phase electric motor as claimed in claim 10 further comprising the step of estimating said motor force signal as a function of said quadrature axis equivalent current, $I_Q$.

12. A field oriented control method for generating phase currents to drive a multiple phase electric motor as claimed in claim 11 wherein the step of estimating said motor force signal comprises the step of multiplying said quadrature axis equivalent current, $I_Q$, by a constant, $K_1$.

13. A field oriented control method for generating phase currents to drive a multiple phase electric motor as claimed in claim 10 wherein the step of converting said direct axis equivalent current $I_D$ into a desired direct axis equivalent current $I_D{}^*$ further comprises comparing said direct axis equivalent current, $I_D$ to a commanded direct axis equivalent current, $I_D{}'$.

14. A field oriented control method for generating phase currents to drive a multiple phase electric motor as claimed in claim 10 wherein the step of determining the electrical rotary position $\theta_E$ of the armature of said motor from its mechanical rotary position $\theta_M$ is performed by solving the equation, $\theta_E = P/2(\theta_M)$, where P is the number of motor poles, and the step of transforming the phase currents flowing in the individual phases of said motor into a quadrature axis equivalent current, $I_Q$, and a direct axis equivalent current, $I_D$, is performed by solving the equations, $$I_Q = \tfrac{2}{3}\{I_A \cos\theta_E + I_B \cos(\theta_E - 120°) + I_C \cos(\theta_E + 120°)\}$$
$$I_D = \tfrac{2}{3}\{I_A \sin\theta_E + I_B \sin(\theta_E - 120°) + I_C \sin(\theta_E + 120°)\}.$$

15. A field oriented control method for generating phase currents to drive a multiple phase electric motor as claimed in claim 14 wherein the step of calculating the phase currents, $I_A{}^*$, $I_B{}^*$, $I_C{}^*$, for driving said motor is performed by solving the equations, $$I_A{}^* = I_Q{}^* \cos\theta_E + I_D{}^* \sin\theta_E$$
$$I_B{}^* = I_Q{}^* \cos(\theta_E - 120°) + I_D{}^* \sin(\theta_E - 120°)$$
$$I_C{}^* = I_Q{}^* \cos(\theta_E + 120°) + I_D{}^* \sin(\theta_E - 120°).$$

* * * * *